United States Patent
Fan et al.

(10) Patent No.: US 9,210,331 B2
(45) Date of Patent: Dec. 8, 2015

(54) CAMERA DEVICE AND FLASH LIGHT CONTROL METHOD

(71) Applicant: HTC Corporation, Taoyuan, Taoyuan County (TW)

(72) Inventors: Fu-Cheng Fan, Taoyuan (TW); Chih-Jen Hu, Taoyuan (TW); Ming-Tien Lin, Taoyuan (TW); Chun-Ta Lin, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 42 days.

(21) Appl. No.: 13/938,702

(22) Filed: Jul. 10, 2013

(65) Prior Publication Data

US 2015/0015721 A1    Jan. 15, 2015

(51) Int. Cl.
*H04N 5/235*   (2006.01)
*H04N 5/225*   (2006.01)
*H04N 17/00*   (2006.01)

(52) U.S. Cl.
CPC ........... *H04N 5/2354* (2013.01); *H04N 5/2256* (2013.01); *H04N 17/002* (2013.01)

(58) Field of Classification Search
CPC .. H04N 5/2354; H04N 17/002; H04N 5/2256
See application file for complete search history.

(56) References Cited

U.S. PATENT DOCUMENTS

| | | | | |
|---|---|---|---|---|
| 5,583,397 | A * | 12/1996 | Ogawa | 348/227.1 |
| 2003/0052992 | A1* | 3/2003 | Nakata | 348/371 |
| 2006/0133061 | A1* | 6/2006 | Maeda | 362/6 |
| 2007/0196095 | A1 | 8/2007 | Perala et al. | |
| 2008/0297644 | A1* | 12/2008 | Farchtchian et al. | 348/340 |
| 2009/0243493 | A1* | 10/2009 | Bergquist | 315/149 |
| 2010/0124041 | A1* | 5/2010 | Druchinin | 362/16 |
| 2010/0254692 | A1 | 10/2010 | Kurt et al. | |
| 2012/0262571 | A1 | 10/2012 | Wang et al. | |
| 2013/0010155 | A1* | 1/2013 | Hamada | 348/223.1 |
| 2013/0128103 | A1* | 5/2013 | Spielberg | 348/371 |
| 2013/0235551 | A1* | 9/2013 | Hamada | 362/11 |
| 2014/0085503 | A1* | 3/2014 | Su et al. | 348/223.1 |

* cited by examiner

*Primary Examiner* — Jason Flohre
(74) *Attorney, Agent, or Firm* — Birch, Stewart, Kolasch & Birch, LLP

(57) ABSTRACT

A camera device is provided. The camera device includes a flash unit, an image capture module, and a controller. The flash unit generates a preset flash with a predetermined Correlated Color Temperature value to illuminate an object, and the image capture module captures a test image from the object when the preset flash illuminates the object. The controller determines an adjusted CCT value according to a color difference between the test image and a predetermined color. When the controller has determined the adjusted CCT value, the flash unit generates an adjusted flash with the adjusted CCT value to illuminate the object. When the adjusted flash illuminates the object, the image capture module captures an adjusted image.

16 Claims, 8 Drawing Sheets

CAMERA DEVICE AND FLASH LIGHT CONTROL METHOD

TECHNICAL FIELD

The invention relates to camera devices, and more particularly relates to camera devices having a flash light unit.

BACKGROUND

Nowadays, flash lights may be used when taking photographs in poor illumination conditions. The correlated color temperature of the flash light may deviate substantially from the correlated color temperature of natural day light, such as sunlight. Consequently, the colors of photos taken using flash light may appear unnatural.

The conventional flash unit produces a flash with a factory-determined correlated color temperature, and most flashes are designed to produce a fixed color temperature corresponding to daylight (about 5,500 Kelvin). However, the flash at such a color temperature may produce undesirable effects on a photograph. Therefore, an improved flash unit having a proper color temperature is needed.

SUMMARY

An embodiment of a camera device is provided, and the camera device comprising: a flash unit, generating a preset flash with a predetermined Correlated Color Temperature value (CCT value) to illuminate an object; an image capture module, capturing a test image from the object when the preset flash illuminates the object; and a controller, determining an adjusted CCT value according to a color difference between the test image and a predetermined color, wherein when the controller has determined the adjusted CCT value, the flash unit generates an adjusted flash with the adjusted CCT value to illuminate the object, and when the adjusted flash illuminates the object, the image capture module further captures an adjusted image.

An embodiment of a flash light control method, for a camera device having a flash unit and an image capture module is provided, the method comprising: generating a preset flash with a predetermined CCT value to illuminate an object by the flash unit; capturing a test image from the object when the preset flash illuminates the object; determining an adjusted CCT value according to a color difference between the test image and a predetermined color; when the adjusted CCT value has been determined, generating an adjusted flash with the adjusted CCT value to illuminate the object by the flash unit; and when the adjusted flash illuminates the object, capturing an adjusted image by the image capture module.

DESCRIPTION OF EMBODIMENTS

Figure 1:
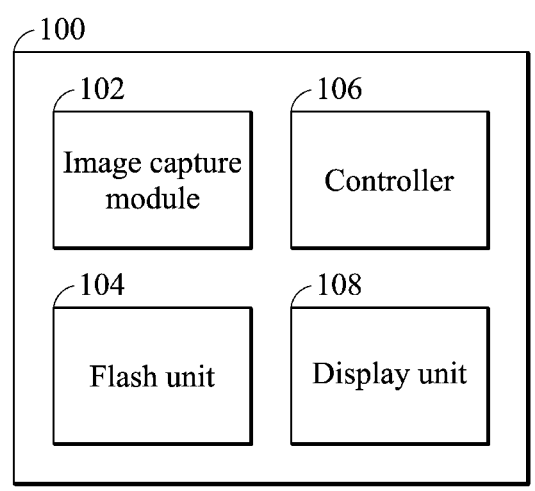
FIG. 1 is a block diagram illustrating an embodiment of a camera 100.

Embodiments, or examples, illustrated in the drawing are now disclosed using specific language. It will nevertheless be understood that the embodiments and examples are not intended to be limiting. Any alterations and modifications in the disclosed embodiments, and any further applications of the principles disclosed in this document are contemplated as would normally occur to one of ordinary skill in the pertinent art. Reference numbers may be repeated throughout the embodiments, but they do not require that feature(s) of one embodiment apply to another embodiment, even if they share the same reference number.

FIG. 1 is a block diagram illustrating an embodiment of a camera device 100. The camera device 100 may be a digital camera, a mobile phone with camera functions, or any electronic device with camera functions. The camera device 100 comprises an image capture module 102, a flash unit 104, a controller 106, and a display 108. The image capture module 102 is configured to capture an image from an object or a scene. Sometimes the captured image is not clear because the object is in poor illumination conditions or the scene is too dark for the capture module 102, so that the flash unit 104 may generate a complement light or a flash to illuminate the object or the scene. However, the complement light or the flash may cause the image to look unnatural.

To solve this problem, in some embodiments of the present invention, the flash unit 104 generates a preset flash with a predetermined Correlated Color Temperature value (CCT value) to illuminate an object, and the image capture module 102 captures a test image from an object when the preset flash illuminates the object. Next, the controller 106 analyzes the test image, and calculates a color difference between the test image and a preset target, wherein the preset target may be a predetermined color which can be set by a user or a default value corresponding to the scene. For example, the predetermined color may be the natural skin color of a human face. After the color difference between the test image and a preset target has been calculated, the controller 106 calculates an adjusted CCT value of the flash unit which may minimize the color difference of the captured image and the preset target. In an embodiment, the calculation of the controller 106 can be performed by comparison with a look-up table or substituting the reference value of the test image into a predetermined function. In some embodiments, the adjusted CCT value may be equal to the background CCT value of the scene, and the background CCT value of the scene can obtained by analyzing the test image.

Figure 2:
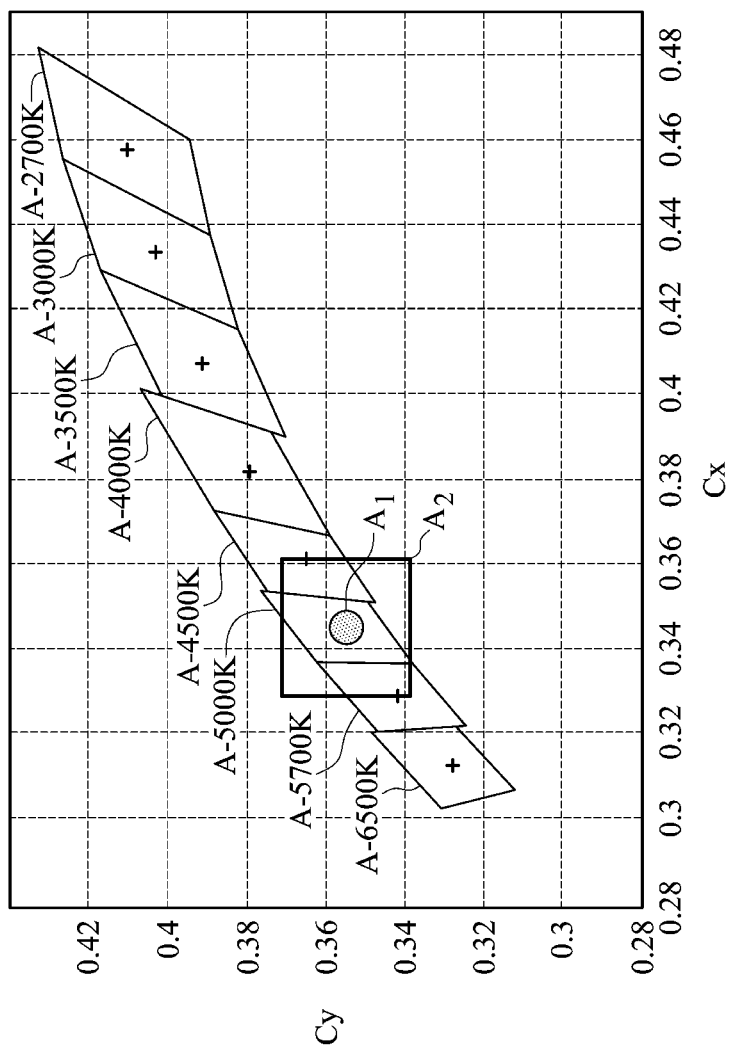
FIG. 2 is a CIE 1931 Chromaticity diagram illustrating an embodiment of chromaticity of the adjusted flash and the test image.

In an embodiment, the controller 106 determines the adjusted CCT value of the adjusted flash according to the coordinates x and y of the test image on the CIE 1931 Chromaticity diagram. For example, as shown in FIG. 2, area A-6500 K, area A-5700K, area A-5000 K, area A-4500 K, area A-4000 K, area A-3500 K, are A-3000 K and are A-2700 K indicate the CCT value 6500 K, 5700 K, 5000 K, 4500 K, 4000 K, 3500 K, 3000 K and 2700 K on the CIE 1931 Chromaticity diagram, respectively. Also, when the background CCT value of the scene is corresponding to the area A1 on the CIE 1931 Chromaticity diagram, the controller 106 may determine the adjusted CCT value of the adjusted flash corresponding to the area A2 on the CIE 1931 Chromaticity diagram. In more detail, the difference between a CIE 1931 Chromaticity coordinate x of the adjusted flash and a CIE 1931 Chromaticity coordinate x (Cx) of the test image is smaller than 0.03, and the difference between a CIE 1931 Chromaticity coordinate y (Cy) of the adjusted flash and a CIE 1931 Chromaticity coordinate y of the test image is also smaller than 0.03.

When the controller 106 has determined the adjusted CCT value, the flash unit 104 generates an adjusted flash with the adjusted CCT value to illuminate the object. Meanwhile, the image capture module 102 captures an adjusted image. Next, the display 108 outputs the adjusted image. Therefore, the adjusted image may look more natural than the test image. It should be noted that, the adjusted CCT value of the adjusted flash may be changed by users. For example, if a user wants the human face on the adjust image to look more bright and pretty, the adjusted CCT value may set to be lower than the background CCT value of the scene.

Figure 3:
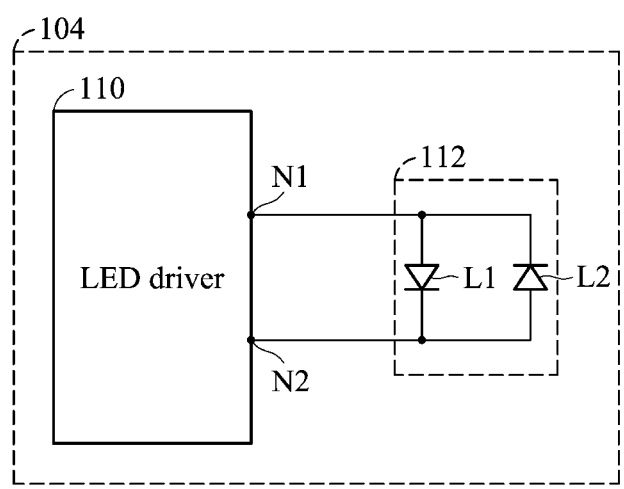
FIG. 3 is a brief circuit diagram illustrating an embodiment of the flash unit.

The embodiments of the flash unit 104 are further described in the following paragraphs. FIG. 3 is a brief circuit diagram illustrating an embodiment of the flash unit 104. In the embodiment, the flash unit 104 comprises an LED driver 110 and an LED module 112. The LED module 112 is formed by two Light Emitting Diodes (LEDs) L1 and L2, and the LED L1 and LED L1 have different CCT values. As shown in FIG. 2, the anode of the LED L1 and the cathode of the LED L2 are coupled together, and the anode of LED L2 and the cathode of the LED L1 are coupled together. Therefore, when the controller 106 provides a driving voltage/current on node N1, only the LED L1 is turned on. On the other hand, when the controller 106 provides a driving voltage/current on node N2, only the LED L2 is turned on. By this, the LEDs L1 and L2 are protected from electrostatic discharge (ESD), and there is no need to add a further zener diode thereto, as the conventional circuit, such that the size of the LED module can be reduced. In some embodiments, the LED driver 110 may be integrated into the controller 106.

In order to generate the adjusted flash with the adjusted CCT value, the LED driver 110 provides a voltage/current to the node N1 to turn on the LED L1 during a first period, and provides a voltage/current to the node N2 to turn on the LED L2 during a second period. The LED driver 110 may adjust the first period of the LED L1 and the second LED L2 to generate a mixed light with the adjusted CCT value. For example, the CCT value of the LED L1 is 3,000 K, and the CCT value of the LED L2 is 5,500 K. If the adjusted CCT value is 4,000 K, the LED driver 110 adjusts the ratio of the first period to the second period is 2:3. This will be described in detail in the following paragraph.

Figure 4A:
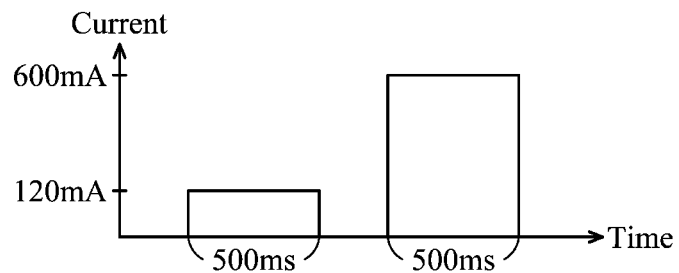
FIG. 4A illustrates a conventional embodiment of an LED driving current waveform for an LED having a CCT value of 4,000 K.
Figure 4B:
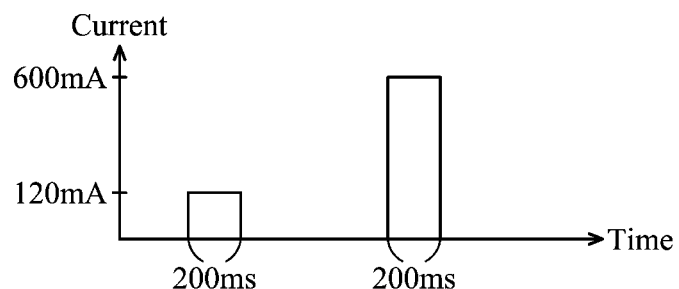
FIG. 4B illustrates an embodiment of an LED driving current waveform for the LED L1 having a CCT value of 3,000 K when the adjusted CCT value of 4,000 K.
Figure 4C:
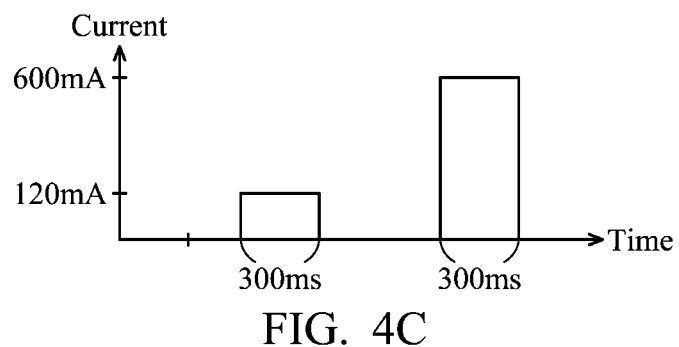
FIG. 4C illustrates an embodiment of an LED driving current waveform for the LED L2 having a CCT value of 5,500 K when the adjusted CCT value of 4,000 K.

FIG. 4A illustrates a conventional embodiment of an LED driving current waveform for an LED having a CCT value of 4,000 K. FIG. 4B illustrates an embodiment of an LED driving current waveform for the LED L1 having a CCT value of 3,000 K when the adjusted CCT value is 4,000 K, and FIG. 4C illustrates an embodiment of an LED driving current waveform for the LED L2 having a CCT value of 5,500 K when the adjusted CCT value is 4,000 K. As shown in FIGS. 3A-3C, when the LED L1 and the LED L2 generate a mixed light equal to the light generated by providing the 120 mA current to the LED (4,000 K) for 500 ms, the LED driver 110 provides a 120 mA current to the LED L1 for 200 ms, and the LED driver 110 provides a 120 mA current to the LED L2 for 300 ms. Also, when the LED L1 and the LED L2 generate a mixed light equal to the light generated by providing a 500 mA current to the LED (4,000 K) for 500 ms, the LED driver 110 provides a 500 mA current to the LED L1 for 200 ms, and the LED driver 110 provides a 120 mA current to the LED L2 for 500 ms. Therefore, the flash unit with an adjustable CCT value is operated by adjusting the ratio of the first period to the second period. It should be noted that numbers of the current or the first and the second periods in this embodiment are only for example, and the invention is not limited thereto.

In some embodiments, the flash unit 104 may comprise an electrochromic layer, and an LED module. Because the electrochromic layer can change its color by applying different voltages thereto, the adjusted flash can be generated by passing the light from the LED module through the electrochromic layer. In this embodiment, the controller 106 provides the adjusted CCT value to an electrochromic layer driver, and the electrochromic layer driver determines an adjusted voltage according to the adjusted CCT value of the adjusted flash. Next, the electrochromic layer driver provides the adjusted voltage to the electrochromic layer, and the LED module outputs a light through the electrochromic layer, such that the adjusted flash can be generated.

Figure 5C:
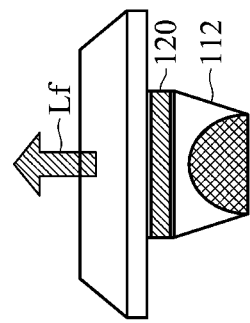
FIGS. 5A-5C are schematic diagrams illustrating an embodiment of a flash unit having an electrochromic layer applied by different voltages according to the invention.
Figure 5B:
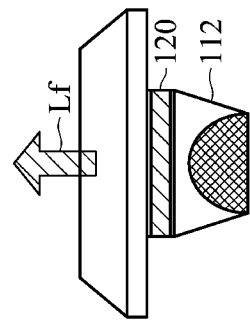
Figure 5A:
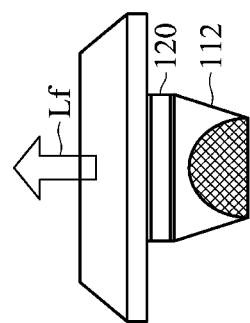

For example, FIGS. 5A-5C are schematic diagrams illustrating an embodiment of a flash unit having an electrochromic layer applied by different voltages according to the invention. Based on the adjusted CCT value received from the controller, the electrochromic layer driver (not shown) applies voltage V1 to the electrochromic layer 120 in FIG. 5A, applies voltage V2 to the electrochromic layer 120 in FIG. 5B, and applies voltage V3 to the electrochromic layer 120 in FIG. 5C, wherein the voltage V3 is larger than voltage V2, and the voltage V2 is larger than voltage V1. Therefore, the colors of the electrochromic layer 120 of FIGS. 5A-5C are different from each other. Also, as shown in FIGS. 5A-5C, the LED module 112 is arranged to face the electrochromic layer 120, and the light generated by the LED module 112 passes through the electrochromic layer 120, such that the adjusted flash Lf is generated. It should be noted that, the CCT of the flash Lf of FIGS. 5A-5C are different from each other, because the colors of the electrochromic layer 120 of FIGS. 5A-5C are different from each other. In more detail, the voltage V3 is larger than voltage V2, and the voltage V2 is larger than voltage V1, so that the CCT of the flash Lf in FIG. 5A is lower than the CCT of the flash Lf in FIG. 5B, and the CCT of the flash Lf in FIG. 5B is lower than the CCT of the flash Lf in FIG. 5C. Therefore, the flash unit having the adjustable CCT can be accomplished by adjusting the voltage applied to the electrochromic layer 120.

Figure 6:
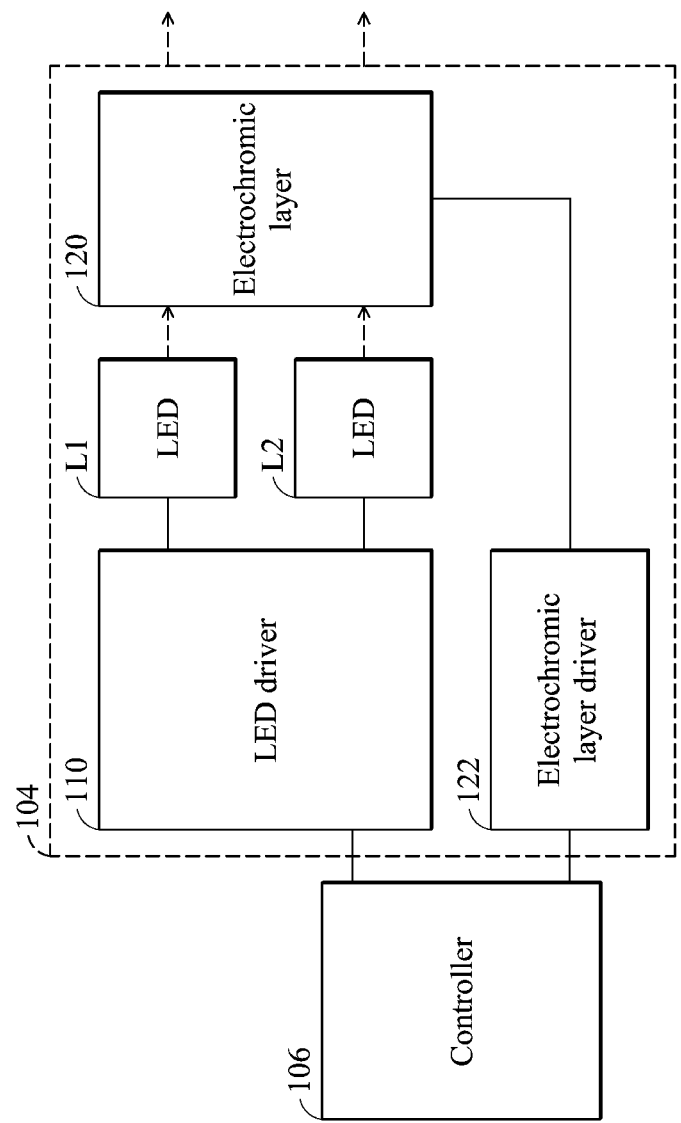
FIG. 6 is a block diagram illustrating an embodiment of a flash unit having two LEDs and an electrochromic layer for CCT adjustment.

In some embodiments, the LED module may comprise two or more LEDs as the embodiment in FIG. 3, so that the CCT value and color of the flash can have a broad adjustable range. For example, FIG. 6 is a block diagram illustrating an embodiment of a flash unit having two LEDs and an electrochromic layer for CCT adjustment. The flash unit 104 comprises an LED L1, an LED L2, an LED driver 110, an electrochromic layer 120, and an electrochromic layer driver 122. The LED driver 110 is connected to the LED L1 and the LED L2, and the electrochromic layer driver 122 is connected to electrochromic layer 120. Also, the LED driver 110 and the electrochromic layer driver 122 of the flash unit 104 are connected to the controller 106 respectively, and the controller 106 may transmits a CCT value to the LED driver 110 and the electrochromic layer driver 122. Next, the LED driver 110 drives the LED L1 and the LED L2 according to the CCT value, and the electrochromic layer driver 122 drives the electrochromic layer 120 according to the CCT value. Further, the lights generated by the LED L1 and the LED L2 pass through the electrochromic layer 120, as the arrow shown in FIG. 6. Therefore, the adjusted flash can be obtained.

Figure 7:
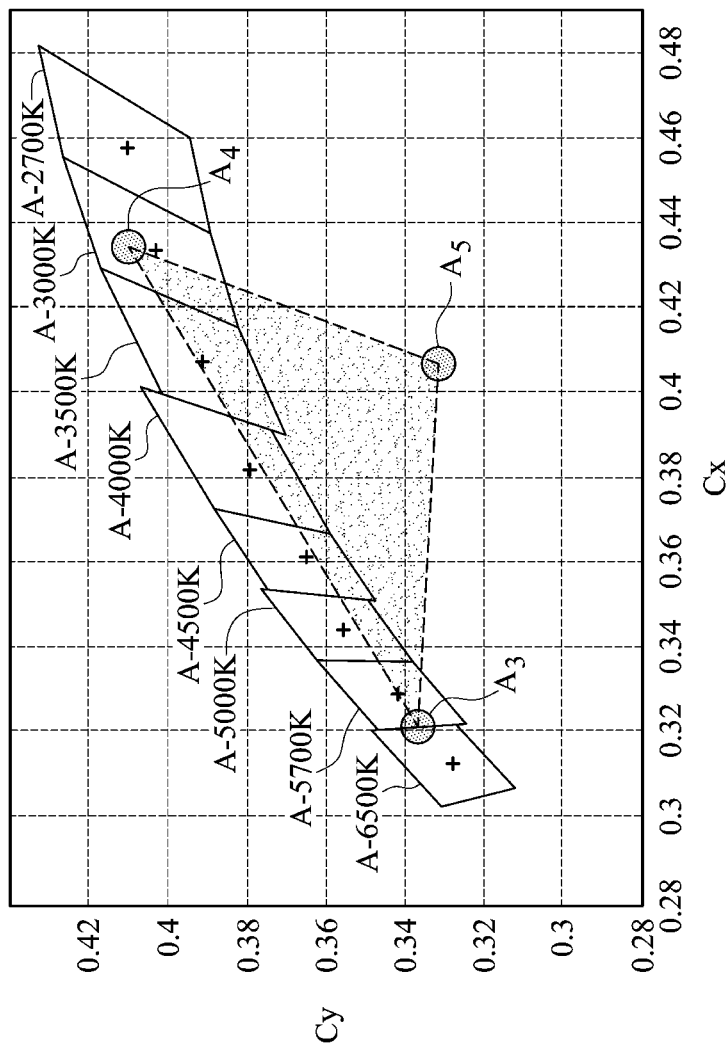
FIG. 7 is a CIE 1931 Chromaticity diagram illustrating an embodiment of chromaticity of a flash unit having two LEDs and an electrochromic layer.

Furthermore, FIG. 7 is a CIE 1931 Chromaticity diagram illustrating an embodiment of chromaticity of a flash unit having two LEDs and an electrochromic layer. In this embodiment, the CCT values of the LEDs are 6000 K (A3) and 3000 K (A4). Also, area A-6500 K, area A-5700 K, area A-5000 K, area A-4500 K, area A-4000 K, area A-3500 K, are A-3000 K and are A-2700 K indicate the CCT value 6500 K, 5700 K, 5000 K, 4500 K, 4000 K, 3500 K, 3000 K and 2700 K on the CIE 1931 Chromaticity diagram, respectively. In should be noted that, the adjustable chromaticity of the mixed light of the LEDs are chromaticity on the line section between the area A3 and the area A4. However, after the electrochromic layer is further added in the flash unit, the chromaticity on the area A5 can be performed by adjusting the electrochromic layer and the LEDs. Therefore, the range of the adjustable chromaticity of the mixed light becomes larger as the triangular area surrounded by area A3, A4 and A5 in FIG. 7.

Figure 8:
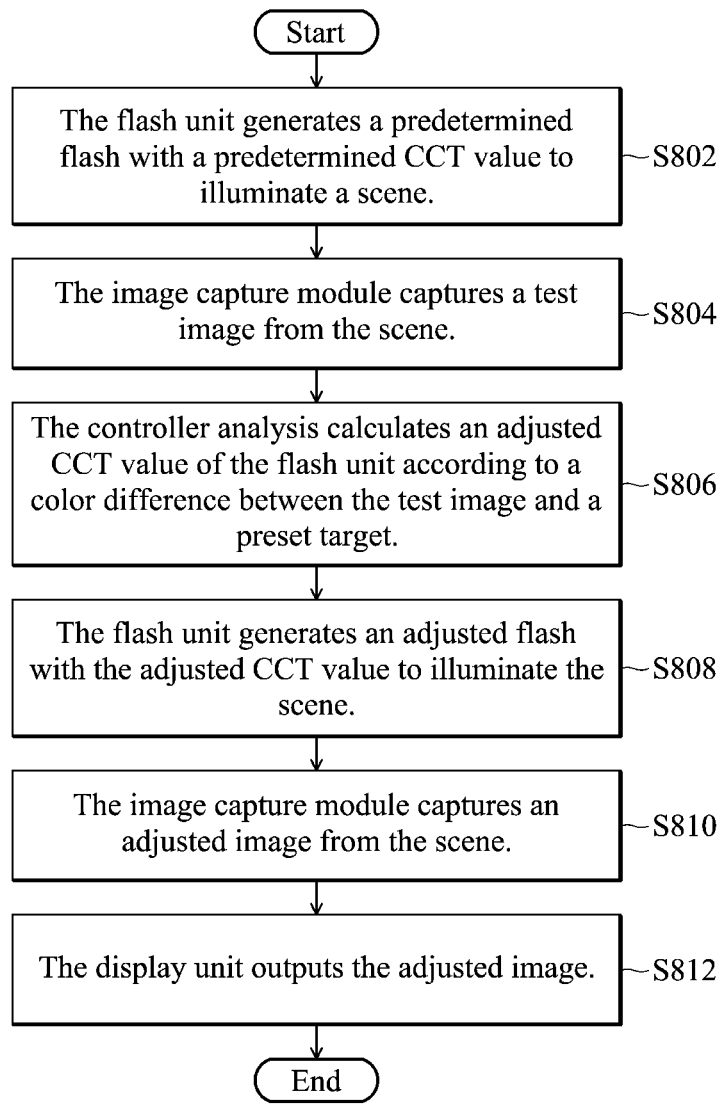
FIG. 8 is a flowchart of an embodiment of a method for the camera shown in FIG. 1.

FIG. 8 is a flowchart of an embodiment of a method for the camera shown in FIG. 1. In step S802, the flash unit 104 generates a preset flash with a predetermined CCT value to illuminate an object/scene. In step 5804, the image capture module 102 captures a test image from the object when the preset flash illuminates the object. Next, in step S806, the controller 106 analyzes the test image, calculates a color difference between the test image and a preset target, and calculates an adjusted CCT value of the flash unit which may minimize the color difference of the captured image and the preset target. In some embodiments, the adjusted CCT value may be equal to the CCT value of the scene, and the CCT value of the scene can be obtained by analyzing the test image.

In the step S808, when the controller 106 has determined the adjusted CCT value, the flash unit 104 generates an adjusted flash with the adjusted CCT value to illuminate the object. Next, in step S810, the image capture module 102 captures an adjusted image from the object when the adjusted flash illuminates the object. In step S812, the display 108 outputs the adjusted image accordingly. It should be noted that when the step S406 is finished, it may not be necessary to start the step S408 immediately. For example, when the controller 106 has determined the adjusted CCT value in step S806, the adjusted CCT value may be temporarily stored in a memory. Next, when a user takes a picture by the camera device 100, the flash unit 104 generates the adjusted flash with the adjusted CCT value to illuminate the object, and the image capture module 102 captures an adjusted image.

The flash light control methods for the camera device, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

The above paragraphs describe many aspects of the invention. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A camera device, comprising:
   a flash unit, generating a preset flash with a predetermined Correlated Color Temperature value (CCT value) to illuminate an object, wherein the flash unit comprises an electrochromic layer and an LED module having a first LED and a second LED, and the first LED and the second LED have different CCT values from each other;
   an image capture module, capturing a test image from the object when the preset flash illuminates the object; and
   a controller, determining an adjusted CCT value according to a color difference between the test image and a predetermined color,
   wherein when the controller has determined the adjusted CCT value, the flash unit generates a mixed light by turning on the first LED during a first period and turning on the second LED during a second period, an adjusted flash is generated by passing the mixed light through the electrochromic layer, the adjusted flash with the adjusted CCT value to illuminate the object,
   wherein when the adjusted flash illuminates the object, the image capture module captures an adjusted image, wherein a color of the electrochromic layer can be changed based on a voltage applied to the electrochromic layer, and
   wherein the controller is configured to control the flash unit to generate the adjusted flash with the adjusted CCT value by adjusting a ratio of the first period to the second period and the voltage applied to the electrochromic layer.

2. The camera device of claim 1, wherein the controller determines the first period and the second period according to the adjusted CCT value.

3. The camera device of claim 1, wherein an anode of the first LED is coupled to a cathode of the second LED, and a cathode of the first LED is coupled to an anode of the second LED.

4. The camera device of claim 1, wherein the flash unit comprises an LED module and an electrochromic layer, and the LED module generates a light according to the adjusted CCT value, and the adjusted flash is generated by passing the light through the electrochromic layer.

5. The camera device of claim 4, wherein the LED module further comprises an electrochromic layer driver, and the electrochromic layer driver provides an adjusted voltage to the electrochromic layer, and the adjusted voltage is determined according to the adjusted CCT value of the adjusted flash.

6. The camera device of claim 1, wherein the controller further determines a background CCT value according to the test image, and sets the adjusted CCT value of the adjusted flash to be lower than the background CCT.

7. The camera device of claim 1, wherein the difference between a CIE 1931 Chromaticity coordinate x of the adjusted flash and a CIE 1931 Chromaticity coordinate x of the test image is smaller than 0.03, and the difference between a CIE 1931 Chromaticity coordinate y of the adjusted flash and a CIE 1931 Chromaticity coordinate y of the test image is smaller than 0.03.

8. The camera device of claim 1, further comprising a display outputting the adjusted image.

9. A flash light control method, for a camera device having a flash unit and an image capture module, wherein the flash unit comprises an electrochromic layer and an LED module having a first LED and a second LED, and the first LED and the second LED have different CCT values from each other, the method comprising:
 generating a preset flash with a predetermined CCT value to illuminate an object by the flash unit;
 capturing an image from the object when the preset flash illuminates the object;
 determining an adjusted CCT value according to a color difference between the image and a predetermined color;
 when the adjusted CCT value has been determined, generating a mixed light by turning on the first LED during a first period and turning on the second LED during a second period;
 generating an adjusted flash with the adjusted CCT value by passing the mixed light through the electrochromic layer to illuminate the object by the flash unit, and adjusting a ratio of the first period to the second period and the voltage applied to the electrochromic layer; and
 when the adjusted flash illuminates the object, capturing an adjusted image by the image capture module, wherein a color of the electrochromic layer can be changed based on a voltage applied to the electrochromic layer.

10. The method of claim 9, further comprising determining the first period and the second period according to the adjusted CCT value.

11. The method of claim 9, wherein an anode of the first LED is coupled to a cathode of the second LED, and a cathode of the first LED is coupled to an anode of the second LED.

12. The method of claim 9, wherein the flash unit comprises an LED module and an electrochromic layer, and the LED module generates a light according to the adjusted CCT value, and
 wherein the method further comprises generating the adjusted flash by passing the mixed light through the electrochromic layer.

13. The method of claim 12, further comprising:
 determining an adjusted voltage according to the adjusted CCT value of the adjusted flash; and
 providing the adjusted voltage to the electrochromic layer.

14. The method of claim 9, further comprising:
 determining a background CCT value according to the test image; and
 setting the adjusted CCT value of the adjusted flash to be lower than the background CCT.

15. The method of claim 9, wherein the difference between a CIE 1931 Chromaticity coordinate x of the adjusted flash and a CIE 1931 Chromaticity coordinate x of the image is smaller than 0.03, and the difference between a CIE 1931 Chromaticity coordinate y of the adjusted flash and a CIE 1931 Chromaticity coordinate y of the image is smaller than 0.03.

16. The method of claim 9, further comprising outputting the adjusted image by a display.

* * * * *